(12) United States Patent
Jo et al.

(10) Patent No.: US 8,715,858 B2
(45) Date of Patent: May 6, 2014

(54) METHOD FOR PREPARING LITHIUM MANGANESE OXIDE POSITIVE ACTIVE MATERIAL FOR LITHIUM ION SECONDARY BATTERY, POSITIVE ACTIVE MATERIAL PREPARED THEREBY, AND LITHIUM ION SECONDARY BATTERY INCLUDING THE SAME

(75) Inventors: Sung Nim Jo, Chungcheongnam-do (KR); Mi Sun Lee, Chungcheongnam-do (KR); Hae In Cho, Chungcheongnam-do (KR)

(73) Assignee: Samsung Fine Chemicals Co., Ltd., Ulsan (KR)

( * ) Notice: Subject to any disclaimer, the term of this patent is extended or adjusted under 35 U.S.C. 154(b) by 0 days.

(21) Appl. No.: 13/445,896

(22) Filed: Apr. 12, 2012

(65) Prior Publication Data

US 2012/0288767 A1  Nov. 15, 2012

(30) Foreign Application Priority Data

May 2, 2011  (KR) .......................... 10-2011-0041389

(51) Int. Cl.
*H01M 4/36* (2006.01)
*H01M 4/02* (2006.01)
*H01M 4/04* (2006.01)

(52) U.S. Cl.
USPC ................... 429/224; 252/182.1; 29/623.1

(58) Field of Classification Search
USPC ............. 429/218.1, 224, 231.1; 423/599, 594
See application file for complete search history.

(56) References Cited

U.S. PATENT DOCUMENTS

| 6,475,672 | B1 * | 11/2002 | Iwata et al. | ................... 429/224 |
| 2005/0151115 | A1 * | 7/2005 | Hampden-Smith et al. | ......................... 252/182.1 |
| 2006/0257745 | A1 | 11/2006 | Choi et al. | |
| 2010/0019208 | A1 | 1/2010 | Choi et al. | |

FOREIGN PATENT DOCUMENTS

| JP | 2002279984 | * | 9/2002 |
| KR | 10-2004-0015266 | | 2/2004 |
| KR | 2006-0091486 A | | 8/2006 |

OTHER PUBLICATIONS

Machine Translation of Fumi et al. (JP 2002-279984, Published Sep. 27, 2002).*
Korean Office Action issued in Korean Patent Application No. 10-2011-0041389 dated Nov. 8, 2012.

* cited by examiner

*Primary Examiner* — Basia Ridley
*Assistant Examiner* — Caitlin Wilmot
(74) *Attorney, Agent, or Firm* — Osha Liang LLP

(57) ABSTRACT

A method for preparing a lithium manganese oxide positive active material for a lithium ion secondary battery, which has spherical spinel-type lithium manganese oxide particles having two or more different types of sizes, the method including uniformly mixing manganese oxide having two or more different types of sizes with a lithium containing compound, and heat treating the resultant mixture to obtain lithium manganese oxide.

8 Claims, 2 Drawing Sheets

METHOD FOR PREPARING LITHIUM MANGANESE OXIDE POSITIVE ACTIVE MATERIAL FOR LITHIUM ION SECONDARY BATTERY, POSITIVE ACTIVE MATERIAL PREPARED THEREBY, AND LITHIUM ION SECONDARY BATTERY INCLUDING THE SAME

CROSS-REFERENCE TO RELATED APPLICATION

This application claims priority to and the benefit of Korean Patent Application No. 10-2011-0041389, filed on May 2, 2011, the entire content of which is incorporated herein by reference.

BACKGROUND OF THE INVENTION

1. Field of the Invention

Aspects of the present invention relate to a method for preparing a lithium manganese oxide positive active material for a lithium ion secondary battery. More particularly, aspects of the present invention relate to a method for preparing a lithium manganese oxide positive active material for a lithium ion secondary battery, which has spherical spinel-type lithium manganese oxide particles having two or more different types of sizes, a lithium manganese oxide positive active material prepared thereby, and a lithium ion secondary battery including the same.

2. Description of the Related Art

Due to recent trends toward more compact and lighter portable electronic equipment, such as cellular phones, camcorders and notebook computers, there has been a growing demand for improving characteristics of lithium ion secondary batteries, including high performance, durability and reliability, which can be used as power sources for the electronic equipment. In addition, as much attention has been paid to achieving electromotive vehicles, lithium ion secondary batteries are drawing particular attention as power sources for the electromotive vehicles.

A lithium ion secondary battery generally includes a positive electrode and a negative electrode that are capable of intercalating and deintercalating lithium ion, a separator that prevents the positive electrode and the negative electrode from physically contacting each other, and an organic electrolyte or polymer electrolyte that transmits lithium ion between the positive and negative electrodes. In the lithium ion secondary battery, when lithium ion is intercalated/deintercalated in the positive electrode and the negative electrode, electrical energy is generated through an electrochemical oxidation/reduction reaction.

Carbon materials of various kinds may be used as a negative active material of a lithium ion secondary battery and lithium metal oxide such as $LiCoO_2$, $LiMnO_2$, or $LiMn_2O_4$ may be used.

Among lithium metal oxides, spinel-type lithium manganese oxide is an environmentally friendly and safe positive active material because detrimental heavy metal like cobalt is not used. Thus, the spinel-type lithium manganese oxide is advantageously used for power storage of electromotive vehicles or the like.

However, the spinel-type lithium manganese oxide is disadvantageous in that it has low energy density per weight and volume compared to laminar-type lithium metal oxide.

BRIEF SUMMARY OF THE INVENTION

An aspect of the present invention provides a method for preparing a lithium manganese oxide positive active material for a lithium ion secondary battery, which has spherical spinel-type lithium manganese oxide particles having two or more different types of sizes.

Other aspects of the present invention provide a lithium manganese oxide positive active material prepared by the manufacturing method described above, and a lithium ion secondary battery including the lithium manganese oxide positive active material, which has improved volumetric energy density and battery capacity.

In accordance with one aspect of the present invention, there is provided a method for preparing a lithium manganese oxide positive active material for a lithium ion secondary battery, which has spherical spinel-type lithium manganese oxide particles having two or more different types of sizes, the method including uniformly mixing manganese oxide having two or more different types of sizes with a lithium containing compound, and heat treating the resultant mixture to obtain lithium manganese oxide.

According to an embodiment of the invention, a particle size ratio of relatively larger lithium manganese oxide particles to relatively smaller lithium manganese oxide particles may be 1:0.2 to 1:0.4.

According to an embodiment of the invention, the relatively larger lithium manganese oxide particles and the relatively smaller lithium manganese oxide particles may be mixed in a ratio of 1:1 to 1:3 by weight.

According to an embodiment of the invention, the relatively larger manganese oxide particles may have a particle size in a range of 10 to 20 µm.

According to an embodiment of the invention, the method may further include performing a pre-treatment process by dissolving manganese oxide in an acidic or basic solution and heat treating to control the size and shape of manganese oxide.

According to an embodiment of the invention, the acidic solution may include a sulfuric acid or hydrochloric acid solution, and the basic solution may include an ammonia or sodium hydroxide solution.

According to an embodiment of the invention, the heat treating may be performed at a temperature ranging from 300° C. to 600° C. for 4 to 6 hours.

According to an embodiment of the invention, the method may further include performing a pre-treatment process by milling to control the size and shape of manganese oxide.

In accordance with another aspect of the present invention, there is provided a lithium manganese oxide positive active material for a lithium ion secondary battery, the positive active material prepared by the method stated above.

In accordance with still another aspect of the present invention, there is provided a lithium ion secondary battery including the lithium manganese oxide positive active material prepared by the method stated above, the lithium ion secondary battery including a positive electrode, a negative electrode, a separator, and an organic electrolyte.

As described above, according to the present invention, the spinel-type lithium manganese oxide positive active material has greatly improved volumetric energy density and output characteristics. Thus, a reduction in the battery capacity can be prevented during high-speed charging and discharging, thereby remarkably improving capacity and life characteristics of the lithium ion secondary battery for power storage of electromotive vehicles or the like.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawing, in which.

DETAILED DESCRIPTION OF THE INVENTION

Hereinafter, embodiments of the present invention will be described in detail with reference to the accompanying drawings.

The present invention is directed to a method for preparing a lithium manganese oxide positive active material for a lithium ion secondary battery, which has spherical spinel-type lithium manganese oxide particles having two or more different types of sizes, the method including uniformly mixing manganese oxide having two or more different types of sizes and a lithium containing compound; heat treating the mixture to obtain lithium manganese oxide In the lithium ion secondary battery, lithium metal oxide is mainly used as a positive active material and may be largely divided into a laminar-type, a spinel-type and an olivine type according to the oxide structure. The laminar oxide includes lithium ions intercalated/deintercalated to/from various layers in Van der Waals bonds, and has a general structure of $LiMO_2$ (M=V, Cr, Co, or Ni). The spinel-type oxide has a general structure of $LiM_2O_4$ (M=Ti, V, or Mn) and has a cubiform crystalline structure. The olivine-type oxide may be represented by $LiFePO_4$. Since the olivine-type oxide is structurally stable, it undergoes a small reduction in capacity.

The positive active material prepared according to the present invention is based on spinel-type metal oxide of $LiMn_2O_4$, and may include a metal precursor such as Ni, Zr, Co, Mg, Mo, Al, or Ag in addition to Mn in the form of $LiM_xMn_{2-x}O_4$. In addition, the positive active material may include fluorine-substituted lithium metal composite oxide in the form of $LiM_xMn_{2-x}O_{4-z}F_z$.

In the manufacturing method according to the present invention, the lithium containing compound is a compound that is generally used in a positive active material for a lithium ion secondary battery, and examples thereof may include lithium hydroxide, lithium carbonate, lithium nitrate, and lithium acetate.

Figures 1A, 1B, 1C:
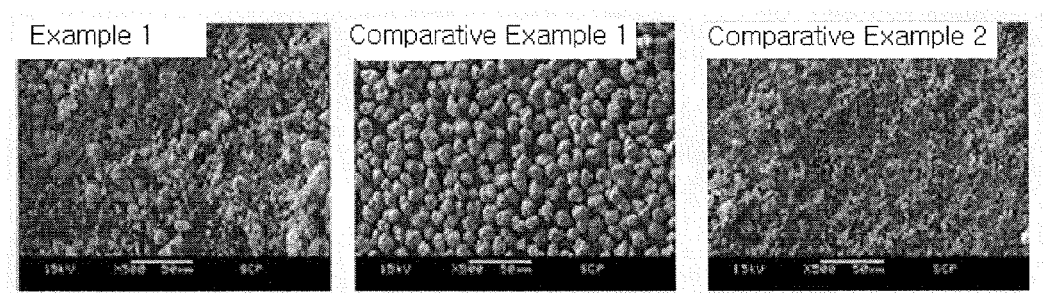
FIGS. 1A, 1B and 1C bare scanning electron microscope (SEM) photographs of products produced in Examples and Comparative Examples.
Figure 2C:
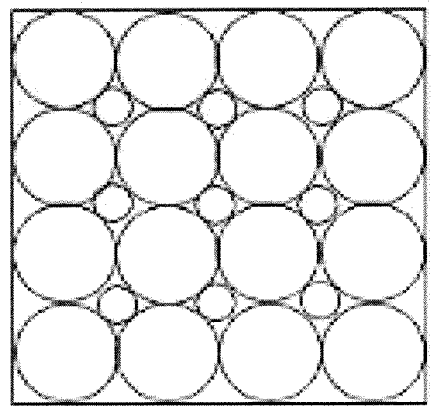
FIGS. 2A-2C illustrate lithium manganese oxide particles of two different sizes.
Figure 2B:
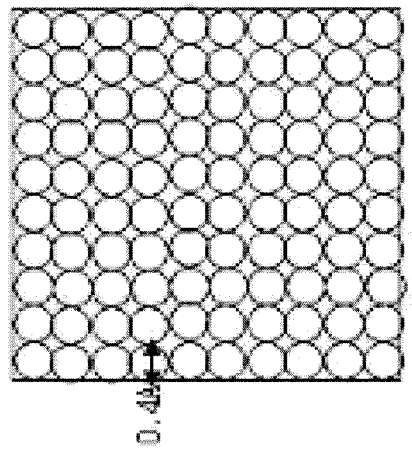
Figure 2A:
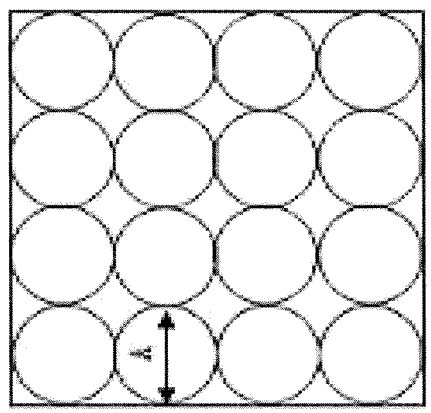

Lithium manganese oxide particles having two or more different types of sizes are used in the present invention, as shown in FIGS. 2A and 2B. A particle size ratio of relatively larger lithium manganese oxide particles (FIG. 2A) to relatively smaller lithium manganese oxide particles (FIG. 2B) may range from 1:0.2 to 1:0.4, preferably 1:0.4. When the particle size ratio is within the range stated above, the electrode capacity per unit volume increases and energy density also increases.

In addition, relatively larger lithium manganese oxide particles and relatively smaller lithium manganese oxide particles may be mixed in a weight ratio ranging from 1:1 to 1:3. When the mixing ratio is within the range stated above, the particles of the two type sizes can be uniformly mixed, as shown in FIG. 2C, which is desirable.

The sizes of the relatively larger lithium manganese oxide particles are preferably in a range of 10 to 20 μm. When the particle size is within the range stated above, the energy density per unit volume of the positive active material increases.

The manufacturing method of the lithium manganese oxide positive active material or a lithium ion secondary battery according to the present invention may include a pre-treatment process for controlling the sizes and shapes of the lithium manganese oxide particles. Generally, the sizes and shapes of the lithium manganese oxide particles are considerably affected by the size and shape of a lithium manganese oxide precursor. Therefore, it is necessary to use lithium manganese oxide having a spherical shape and a desired size.

The size and shape of manganese oxide may vary according to the preparation method of manganese oxide. To achieve the desired size and shape of manganese oxide, a precursor having a spherical shape and a desired size may be used. Alternatively, the size and shape of manganese oxide may be controlled by a pre-treatment process.

The pre-treatment process may include dissolving manganese oxide in an acidic solution such as sulfuric acid or hydrochloric acid or a basic solution such as ammonia or sodium hydroxide, heating at a temperature ranging from 300° C. to 600° C. for 4 to 6 hours for recrystallization, thereby controlling particle sizes of manganese oxide having spherical particles by adjusting pH and concentration. When the temperature and time are within the ranges stated above, it is possible to control the shape of manganese oxide without changing an oxidation number.

Alternatively, the particle size and shape may also be controlled by milling.

The milling may be performed using a milling device such as a ball mill, an attrition mill, a vibration mill, a disk mill, a jet mill, or a rotor mill. In addition, the milling may be performed in a dry type process, a wet type process, or a combination thereof.

After obtaining manganese oxide having a desired particle size through the pre-treatment process, the obtained manganese oxide is uniformly mixed with a lithium containing compound, followed by heat treating, thereby preparing a final product, that is, spinel-type lithium manganese oxide.

The heat treating is a calcinating process and is preferably performed at a temperature ranging from 700° C. to 1000° C. for 10 to 30 hours, more preferably at temperature ranging from 800° C. to 900° C. for 12 to 24 hours. When the temperature and time are within the ranges above, stable spinel-type lithium manganese oxide can be obtained.

The present invention also provides a lithium ion secondary battery including a positive electrode including a positive active material prepared by the manufacturing method according to the present invention, a negative electrode, a separator, and an electrolyte.

An electrode used in a lithium ion secondary battery is generally manufactured by forming a slurry by mixing an active material, a binder and a conductive material with a solvent, coating the slurry on an electrode current collector, drying and compressing the slurry-coated electrode current collector.

Since the lithium ion secondary battery has a positive electrode including the positive active material prepared by the manufacturing method according to the present invention, the safety and life characteristics of the battery can be improved.

In the lithium ion secondary battery according to the present invention, as non-limiting examples, natural graphite, artificial graphite, carbon fiber, coke, carbon black, carbon nanotube, fullerene, activated carbon, lithium metal or lithium alloy, may be used as a negative active material.

A current collector of a lithium ion secondary battery collects electrons by electrochemical reactions of active materials or provides electrons necessary for electrochemical reactions.

Any suitable material can be used as the negative current collector as long as it may have conductivity while not causing a chemical change to a battery, and non-limiting examples thereof may include aluminum, copper, nickel, titan, calcined carbon, stainless steel, copper or stainless steel treated with carbon, nickel, titan or silver, and an aluminum-cadmium alloy.

In addition, any suitable positive current collector material can be used as the negative current collector as long as it may have conductivity while not causing a chemical change to a battery, and non-limiting examples thereof may include stainless steel, aluminum, nickel, titan, calcined carbon, and aluminum or stainless steel treated with carbon, nickel, titan or silver.

The bonding property of the active material may be enhanced by forming fine irregularities on a surface of the current collector. In addition, the current collector may be used in various forms, including film, sheet, foil, net, porous body, foams, fibrous nonwoven, and the like.

A binder binds an active material with a conductive material to fix the active material to the current collector, and examples thereof may include polyvinylidenefluoride, polypropylene, carboxymethylcellulose, starch, hydroxypropylcellulose, polyvinylpyrrolidone, tetrafluoroethylene, polyethylene, ethylene-propylene-diene polymer (EPDM), polyvinyl alcohol, styrene-butadiene rubber, or fluoro rubber, which can be generally used for the lithium ion secondary battery.

Any suitable conductive material can be used as the conductive material as long as it may have conductivity while not causing a chemical change to a battery, and non-limiting examples thereof may include artificial graphite, natural graphite, acetylene black, ketjen black, channel black, lamp black, summer black, conductive fiber such as carbon fiber or metal fiber, conductive metal oxide such as titan oxide, powder of metal such as aluminum or nickel, and so on.

An electrolyte of a lithium ion secondary battery is a medium that allows ions to move between positive and negative electrodes, and an organic electrolyte having a lithium salt dissolved in an organic solvent is generally used.

A salt generally used for an electrolytic solution of a lithium ion secondary battery can be used as the lithium salt, and examples thereof may include $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, and $LiC(CF_3SO_2)_3$, which may be used either singly or in combinations within an appropriate range in which the advantages and effects of the present invention are not impaired.

An organic solvent generally used for the lithium ion secondary battery may also be used in the present invention. Examples of the organic solvent may include ethylene carbonate, propylene carbonate, dimethyl carbonate, diethyl carbonate, methylpropyl carbonate, ethylpropyl carbonate, methylethyl carbonate, butylene carbonate, dimethylsulfoxide, acetonitrile, dimethoxyethane, and diethoxyethane, and may be used either singly or in combinations within an appropriate range in which the advantages and effects of the present invention are not impaired.

The separator disposed between the positive electrode and the negative electrode, prevents an electrical short between the two electrodes and serves as a path of ion transfer. Non-limiting examples of the separator may include single olefin substance such as polyethylene (PE) or polypropylene (PP), or composite olefins, polyamide (PA), poly(acrylonitrile) (PAN), poly(ethylene oxide) (PEO), poly(propylene oxide) (PPO), poly(ethylene glycol) diacrylate (PEGA), polytetrafluoroethylene (PTFE), polyvinylidenfluoride (PVdF), or polyvinylchloride (PVC).

The lithium ion secondary battery according to the present invention can be manufactured by the general method well known in the related art. In addition, the lithium ion secondary battery according to the present invention may have general shapes, including a coin type, a button type, a sheet type, a cylinder type, a planar type, and a prismatic type.

Embodiment examples of the present invention and comparison examples will be explained below, but the present invention is not limited thereto.

Example 1

MnO, having a particle size D50 of 12 μm was dipped into a weak acid solution of HCl having pH of 3 to 4 for about 30 minutes, and heat treated at 500° C. for 5 hours to obtain $Mn_3O_4$ having a particle size of 3~4 μm, which was then mixed with $MnO_2$ having a particle size D50 of 12 μm in a mixing ratio of 1:1, yielding a manganese oxide mixture. The manganese oxide mixture was mixed with $Li_2CO_3$ in a Li:Mn ratio of 1:2, heated at 850° C. for 24 hours, thereby preparing a spinel-type $LiMn_2O_4$ positive active material having particle sizes of 3~4 μm and 12 μm.

Example 2

$Mn_3O_4$ having a particle size D50 of 3~4 μm was prepared from $Mn_3O_4$ having a particle size D50 of 12 μm using a ball mill (manufactured by Wsid@ Laboratory Inc. in the name of Wise Mix Ball Mill), and then mixed with MnO, having a particle size D50 of 12 μm in a mixing ratio of 1:1, yielding a manganese oxide mixture. The manganese oxide mixture was mixed with $Li_2CO_3$ in a Li:Mn ratio of 1:2, heated at 850° C. for 24 hours, thereby preparing a spinel-type $LiMn_2O_4$ positive active material having particle sizes of 3~4 μm and 12 μm.

Example 3

A manganese oxide mixture was obtained by mixing $MnO_2$ having a particle size D50 of 12 μm and $Mn_3O_4$ having a particle size D50 of 1.5 in a mixing ratio of 1:1. The manganese oxide mixture was mixed with $Li_2CO_3$ in a Li:Mn ratio of 1:2, heated at 850° C. for 24 hours, thereby preparing a spinel-type $LiMn_2O_4$ positive active material having particle sizes of 8 μm and 12 μm.

Example 4

A manganese oxide mixture was obtained by mixing $MnO_2$ having a particle size D50 of 12 μm and $Mn_3O_4$ having a particle size D50 of 8 μm in a mixing ratio of 1:1. The manganese oxide mixture was mixed with $Li_2CO_3$ in a Li:Mn ratio of 1:2, heated at 850° C. for 24 hours, thereby preparing a spinel-type $LiMn_2O_4$ positive active material having particle sizes of 8 μm and 12 μm.

Example 5

$MnO_2$ having a particle size D50 of 12 μm was dipped into a weak acid solution of HCl having pH of 3 to 4 for about 30 minutes, and heat treated at 500° C. for 5 hours to obtain $Mn_3O_4$ having a particle size of 3~4 μm, which was then mixed with MnO₂ having a particle size D50 of 12 μm in a mixing ratio of 1:0.5, yielding a manganese oxide mixture. The manganese oxide mixture was mixed with Li₂CO₃ in a Li:Mn ratio of 1:2, heated at 850° C. for 24 hours, thereby preparing a spinel-type LiMn₂O₄ positive active material having particles sizes of 3~4 μm and 12 μm.

Example 6

MnO₂ having a particle size D50 of 12 μm was dipped into a weak acid solution of HCl having pH of 3 to 4 for about 30 minutes, and heat treated at 500° C. for 5 hours to obtain Mn₃O₄ having a particle size of 3~4 μm, which was then mixed with MnO₂ having a particle size D50 of 12 μm in a mixing ratio of 1:4, yielding a manganese oxide mixture. The manganese oxide mixture was mixed with Li₂CO₃ in a Li:Mn ratio of 1:2, heated at 850° C. for 24 hours, thereby preparing a spinel-type LiMn₂O₄ positive active material having particle sizes of 3~4 μm and 12 μm.

Comparative Example 1

Li₂CO₃ and MnO₂ having a particle size D50 of 12 μm were mixed in a Li:Mn ratio of 1:2, and then heated at 850° C. for 24 hours, thereby preparing a spinel-type LiMn₂O₄ positive active material having particle sizes of approximately 12 μm.

Comparative Example 2

MnO₂ having a particle size D50 of 12 μm was dipped into a weak acid solution of HCl having pH of 3 to 4 for about 30 minutes, and heat treated at 500° C. for 5 hours to obtain Mn₃O₄ having a particle size of 3~4 μm, which was then mixed with Li₂CO₃ in a Li:Mn ratio of 1:2, heated at 850° C. for 24 hours, thereby preparing a spinel-type LiMn₂O₄ positive active material having a particle size of 3~4 μm.

The positive active materials prepared in Examples 1-6 and Comparative Examples 1-2, Denim Black as a conductive material, and PVDF as a binder were mixed in a ratio of 94:3:3, yielding a positive active material slurry, and the slurry was coated on an aluminum (Al) foil, thereby manufacturing a positive electrode. Next, a coin cell was manufactured using lithium metal as a negative electrode, a 1.3M LiPF₆ solution having EC/DMC/EC in a ratio of 5:3:2 as an electrolyte. The battery capacity and electrode density of each coin cell were measured and results thereof are shown in Table 1.

TABLE 1

|  | Battery Capacity (mAh/cc) | Electrode Density (g/cc) |
| --- | --- | --- |
| Example 1 | 368 | 3.2 |
| Example 2 | 365 | 3.2 |
| Example 3 | 345 | 3.0 |
| Example 4 | 322 | 2.8 |
| Example 5 | 345 | 3.0 |
| Example 6 | 333 | 2.9 |
| Comparative Example 1 | 299 | 2.6 |
| Comparative Example 2 | 264 | 2.4 |

As shown in Table 1, the coin cells manufactured in Examples 1-6 in which each positive electrode was formed using a positive active material including lithium manganese oxide particles having particle sizes of 3~4 μm and 12 μm, exhibited good properties in electrode density and battery capacity, compared to the coin cells manufactured in Comparative Examples 1-2 in which each positive electrode was formed using a positive active material including positive active material including lithium manganese oxide particles having the same particle size.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A method for preparing a lithium manganese oxide positive active material for a lithium ion secondary battery including spherical spinel-type lithium manganese oxide particles having two or more different sizes, the method comprising:
    performing a pre-treatment process by dissolving manganese oxide in an acidic or basic solution and heat treating to obtain a first manganese oxide having particles of a first size;
    mixing said first manganese oxide with a second manganese oxide having particles of a second size, different from said first size, to obtain a first mixture;
    uniformly mixing said first mixture with a lithium containing compound to obtain a second mixture; and
    heat treating said second mixture to obtain the lithium manganese oxide positive active material comprising a first lithium manganese oxide having particles of a third size, and a second lithium manganese oxide having particles of a forth size, different from said third size.

2. The method of claim 1, wherein a particle size ratio of the first lithium manganese oxide to the second lithium manganese oxide is 1:0.2 to 1:0.4.

3. The method of claim 1, wherein the first lithium manganese oxide and the second lithium manganese oxide are mixed in a ratio of 1:1 to 1:3 by weight.

4. The method of claim 1, wherein the larger of said third size and said fourth size is in a range of 10 to 20 μm.

5. The method of claim 1, wherein the acidic solution includes a sulfuric acid or hydrochloric acid solution, and the basic solution includes an ammonia or sodium hydroxide solution.

6. The method of claim 1, wherein the heat treating in the pre-treatment process is performed at a temperature ranging from 300° to 600° C. for 4 to 6 hours.

7. A lithium manganese oxide positive active material for a lithium ion secondary battery, the positive active material prepared by the method claimed in any one of claims 1 to 4, 5 and 6.

8. A lithium ion secondary battery including the lithium manganese oxide positive active material prepared by the method claimed in any one of claims 1 to 4, 5 and 6, the lithium ion secondary battery comprising a positive electrode, a negative electrode, a separator, and an organic electrolyte.

* * * * *